United States Patent
Gaus

[11] 3,724,294
[45] Apr. 3, 1973

[54] REGULATING INSTALLATION OF A HYDRAULIC CONTROL SYSTEM, ESPECIALLY IN VEHICLE TRANSMISSIONS

[75] Inventor: Hermann Gaus, Stuttgart, Germany
[73] Assignee: Daimler-Benz Aktiengesellschaft, Stuttgart-Unterturkheim, Germany
[22] Filed: Apr. 12, 1971
[21] Appl. No.: 133,120

[30] Foreign Application Priority Data
   Apr. 10, 1970  Germany ............ P 20 17 238.7

[52] U.S. Cl. ............ 74/863, 74/844, 236/98, 74/DIG. 1
[51] Int. Cl. ............ B60k 21/00, G05d 23/00
[58] Field of Search ....137/457; 236/98; 74/844, 863

[56] References Cited
   UNITED STATES PATENTS

| | | | |
|---|---|---|---|
| 2,372,817 | 4/1945 | Dodge | 74/867 X |
| 2,794,349 | 6/1957 | Smirl | 74/752 C |
| 2,903,083 | 9/1959 | Kelley | 74/856 X |
| 2,908,181 | 10/1959 | Smirl | 74/864 |
| 3,465,614 | 9/1969 | Reynolds | 74/869 X |
| 2,300,299 | 10/1942 | Lund | 236/34 |
| 2,098,252 | 11/1937 | Lund | 236/34 |
| 3,165,008 | 1/1965 | Forster | 74/863 |

FOREIGN PATENTS OR APPLICATIONS

| | | | |
|---|---|---|---|
| 1,192,241 | 10/1959 | France | 236/101 |

Primary Examiner—Arthur T. McKeon
Attorney—Craig, Antonelli & Hill

[57] ABSTRACT

A regulating installation for the working or shifting pressure of a hydraulic control system, especially of an automatic vehicle transmission, in which a bimetallic spring circumcirculated by the hydraulic medium is built into the regulating installation, which spring is fixedly mounted at one end and which abuts with the other end at least within a predetermined temperature range at the regulating installation.

19 Claims, 5 Drawing Figures

INVENTOR
HERMANN GAUS

BY Craig, Antonelli,
Stewart + Hill

ATTORNEYS

REGULATING INSTALLATION OF A HYDRAULIC CONTROL SYSTEM, ESPECIALLY IN VEHICLE TRANSMISSIONS

The present invention relates to a regulating installation for the working or shifting pressure of a hydraulic control system, especially of an automatic vehicle transmission.

In hydraulic control systems which are subjected during operation to strong temperature differences, for example, in automatic motor vehicle transmissions, it becomes noticeable in an unpleasant manner that the working or shifting pressure is not temperature-insensitive. It has to be determined that the working or shifting pressure decreases with increasing temperature which in particular with automatic vehicle transmissions, in which the friction clutches are actuated by the working or shifting pressure, leads to the fact that with increasing temperature, the shifting periods change, even though the same prerequisites such as gas pedal position and shifting point are preserved. The cause for such change in shifting times is the fact that with increasing temperature, the spring pre-stress forces of a regulating slide valve member of the regulating installation decrease and the larger leakages occur at higher temperatures by the change in position of the regulating slide valve member with respect to the control edges. The shifting time is also increased in that the friction values of the clutch linings decrease with increasing temperature.

This shifting time increase is disadvantageous in automatic vehicle transmissions because with increasing temperature an additional temperature increase builds up at the respective friction member. It is necessary for the durability of the friction members that at the maximum possible transmission oil temperature, no destruction of the friction linings can take place due to burning up. Consequently, the adjustment of the oil pressure acting upon the friction members is determined far-reachingly by the still-permissive shifting time at the highest oil temperatures. As a result of this design consideration, an optimum in shifting comfort cannot be achieved at low or normal oil temperatures, which is valid primarily with respect to the shifting-up operation, so that the shifting comfort is the greater or the more agreeable, the longer the shifting time.

The present invention is concerned with the task to provide a regulating installation of the aforementioned type, by means of which it is achieved that the working or shifting pressure in the lower temperature ranges is reduced and/or is increased in the upper temperature ranges. It is to be achieved especially with automatic vehicle transmissions that the shifting comfort is improved in the lower temperature ranges by increasing the shifting time whereas in the upper temperature range, the shifting time is reduced, which is favorable for reasons of length of life. The present invention essentially consists in that a bimetallic spring circumcirculated by the medium is installed into the regulating installation, which is fixedly mounted with one end thereof and which abuts at least within a predetermined temperature range with the other end thereof at the regulating installation. It can be achieved thereby that at high oil temperatures a pressure increase results so that the shifting time remains constant or is decreased whereas, on the other hand, at middle or average temperatures, the customary adjustment of the working or shifting pressure can be realized without having to take into consideration the oil temperature prevailing at that time.

An advantageous type of construction of the present invention is obtained if a spiral spring is provided as bimetallic spring whose inner end is held fixedly whereas the outer end, freely movable in dependence on the temperature, is disposed in the movement path of a regulating slide valve member. It is particularly advantageous if the regulating slide valve is provided on two mutually opposite sides of the free end of the bimetallic spring with abutments for the bimetallic spring which are disposed at a distance with respect to one another. It is achieved thereby that the bimetallic spring loads or stresses the regulating slide valve member in the lower temperature range in an opposite direction to the loading or stressing in the upper temperature range whereas simultaneously in a middle temperature range, in which the bimetallic spring does not abut at any abutment of the regulating slide valve, the regulating installation remains uninfluenced.

It is structurally advantageous if the free end of the bimetallic spring is constructed fork-shaped and surrounds a neck-shaped extension of the regulating slide valve member, which is provided at its end with a collar. It may also be appropriate if a fork surrounding the extension of the regulating slide valve member is secured at the end of the bimetallic spring.

In order to achieve also in the middle temperature range an influencing of the working or shifting pressure in such a manner that it remains constant or increases slightly over this temperature range, according to a further feature of the present invention, a compression spring may be arranged between the free end of the bimetallic spring and the collar mounted at the other end of the neck-shaped extension of the regulating slide valve member. The influencing of the working or shifting pressure can be determined by the dimensioning of the compression spring.

In order to compensate for manufacturing and assembly inaccuracies and to have additionally an adjusting possibility for the bimetallic spring, a rotatable and lockable fastening means may be provided for the fixed end of the bimetallic spring. It is thereby advantageous if a pivotal lever adapted to be locked or fixed by means of a screw or the like, serves as fastening and securing means for the fixed end of the bimetallic spring.

A particularly advantageous embodiment of the present invention in an automatic vehicle transmission results if the bimetallic spring engages at a regulating slide valve member which abuts at a diaphragm spring that is loaded or stressed by a diaphragm connected with the suction pipe vacuum of a vehicle engine. One obtains thereby the advantage that the present invention can be realized with structurally slight expenditures in a so-called modulating pressure control that is already present for the most part.

Accordingly, it is an object of the present invention to provide a regulating installation for a hydraulic control system, especially in vehicle transmissions which avoids by simple means the aforementioned drawbacks and shortcomings encountered in the prior art.

It is another object of the present invention to provide a regulating installation for a hydraulic control system, especially for motor vehicle transmissions, which eliminates or at least far-reachingly compensates for the temperature sensitivity of the medium used as shifting or working pressure medium.

Another object of the present invention resides in a regulating installation for a hydraulic control system of a motor vehicle transmission which assures substantially constant shifting times regardless of the temperature of the hydraulic pressure medium.

Still a further object of the present invention resides in a regulating installation for a hydraulic control system of the type described above which is simple in construction and easy to install and also assures long length of life of the various actuating parts of the hydraulic control system.

Another object of the present invention resides in a regulating installation for the hydraulic control systems of automatic vehicle transmissions which precludes premature wear of the shifting elements, assures substantially constant shifting periods, and increases the shifting comfort.

These and other objects, features and advantages of the present invention will become more obvious from the following description when taken in connection with the accompanying drawing which shows, for purposes of illustration only, two embodiments in accordance with the present invention, and wherein.

Figure 1:
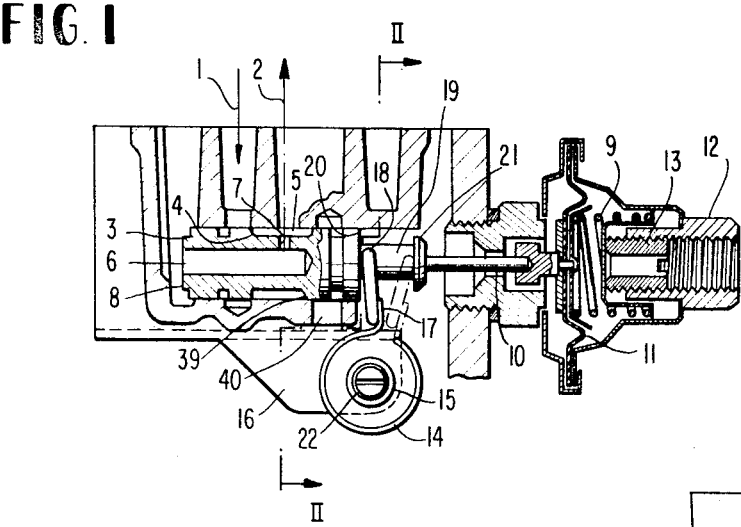
FIG. 1 is a cross-sectional view through a first embodiment of a regulating installation in accordance with the present invention.

Referring now to the drawing wherein like reference numerals are used throughout the various views to designate like parts, and more particularly to FIG. 1, a regulating installation for the shifting pressure of an automatic vehicle transmission (not shown) is illustrated in this figure. The transmission oil is supplied to this regulating installation by way of a line 1 from a feed pump (not shown) and is adjusted in this regulating installation to a predetermined pressure which is then fed by way of a line 2 to a hydraulic amplifier or the like of conventional construction (not shown) which establishes the shifting pressure, properly speaking. The regulating installation includes a regulating slide valve or spool member 3 which adjusts the so-called modulating pressure by means of a control edge 4. The oil flows by way of the control edge 4 into an annular space 5 of the regulating slide valve 3 and is fed from there to the amplifier. On the other hand, oil is able to flow off out of the annular space 5 by way of the bore 40 in a corresponding position of the control edge 39. The end surface 8 of the regulating slide valve member 3 which acts as piston surface, is also subjected to the adjusted pressure by way of a bore 6 disposed in the axial direction of the regulating slide valve and by way of a bore 7 disposed transversely thereto. A diaphragm spring 9 which is operatively connected with the regulating slide valve member 3 by way of a plunger 10, acts in opposition to the movement of the regulating slide valve member 3 as a result of the adjusted pressure.

The interior space of the diaphragm 11 secured to the diaphragm spring 9 is connected by way of a connection 12 with the suction pipe of a motor vehicle engine whereas the outside of the diaphragm 11 is acted upon by the atmospheric air. Consequently, the pressure can be adjusted by this regulating installation which is matched to the torque of the engine by way of the suction pipe vacuum. The prestress force of the diaphragm spring 9 is adjustable by an adjusting screw 13.

A bimetallic spring 14 which is constructed as spiral spring is additionally accommodated in the housing of this regulating installation; the bimetallic spring 14 is disposed below the oil level and is therefore circumcirculated by the transmission oil. The inner end 15 of this spiral spring 14 is fixedly secured at a bracket 16 whereas the free end 17 is able to move freely in dependence on the temperature. The free end 17 is provided with a fork 18 which surrounds a neck-shaped extension 19 of the regulating slide valve member 3. As is illustrated in FIG. 1, the bimetallic spring 14 may abut with its fork 18 against an end surface of the regulating slide valve member 3 serving as abutment 20 and against a collar 21 serving as abutment and mounted at the end of the neck-shaped extension 19. At low temperatures, the fork 18 presses against the collar 21 at the end of the neck-shaped extension 19 of the regulating slide valve member 3. With an increasing temperature, the outer free end 17 of the spiral spring 14 rotates together with the fork 18 in the counterclockwise direction as viewed in FIG. 1 so that the fork 18 lifts off from the collar 21. Within a predetermined range that is determined by the distance between the two abutments 20 and 21, the spiral spring 14 does not exert any force on the regulating slide valve member 3. Thereafter, the fork 18 of the spiral spring 14 abuts against the other abutment 20 and exerts a force on the regulating slide valve member 3 whose direction is now exactly opposite. If the fork 18 of the spiral spring 14 presses against the collar 21, then the modulating pressure and therewith the shifting pressure by means of the amplifier (not shown) is reduced whereas it is increased when the fork 18 assumes the opposite position and acts in an opposite direction against the regulating slide valve member 3.

The fixed end 15 of the bimetallic spring 14 constructed as spiral spring is secured at the bracket 16 by means of a screw 22 which is rotatable for the exact adjustment of the position of the fork 18 of the bimetallic spring 14.

Figure 3:
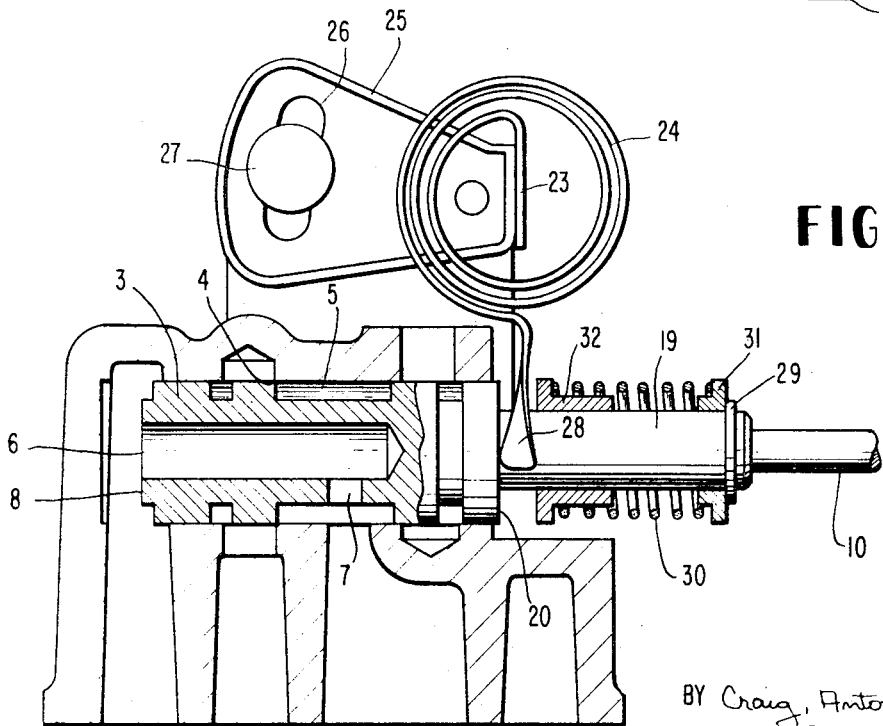
FIG. 3 is a cross-sectional view, on a slightly enlarged scale, through a modified embodiment of a regulating installation in accordance with the present invention.

The embodiment according to FIG. 3 corresponds essentially to the embodiment according to FIG. 1. Differences exist insofar as the fixed end 23 of the bimetallic spring 24 constructed as spiral spring is secured at a pivotal lever 25 which is adapted to be clamped fast in required positions by means of an elongated aperture 26 and a screw 27. The free end of the spiral spring 24 is constructed itself as fork 28 in this embodiment. The two legs of this fork 28 are rotated with respect to the surface of the band of the spiral spring 24. Additionally, in this embodiment a compression spring 30 is arranged between the abutment of this neck-shaped extension 19 of the regulating slide valve member 3 constructed as retaining ring 29 and the free end of the spiral spring 24, which compression spring is retained at a fixed spring plate 31 and is guided on the neck-shaped extension 19 of the regulating slide valve member 3 by means of a guide sleeve 32.

In this embodiment, the fork-shaped end 28 of the spiral spring 24 presses at low temperature against the guide sleeve 32 which is displaced in the direction toward the spring plate 31 and abuts at the latter. The compression spring 30 is thereby compressed. The force of the bimetallic spring 24 therefore acts opposite the force of the diaphragm spring (not shown) and brings about a pressure decrease.

With increasing oil temperatures, the fork-shaped end of the bimetallic spring 24 constructed as spiral spring rotates in the clockwise direction. The decreasing prestress force of the compression spring 30 then only still acts on the regulating slide valve member 3 as correcting force, and more particularly for such length of time until at high oil temperatures, the fork-shaped end 28 of the bimetallic spring 24 abuts at the abutment 20 of the regulating slide valve member 3 and now presses on the same in the direction of the diaphragm spring force.

In both embodiments, the adjustment of the modulating pressure is realized by the prestress of the diaphragm spring 9 in the middle temperature range, about 20°C. to about 90°C. Since the modulating pressure is thereby kept independent of the temperature (FIG. 1) or increases only slightly as a function of temperature (FIG. 3), the transmission oil temperature need not be taken into special consideration for the adjustment.

Figure 2:
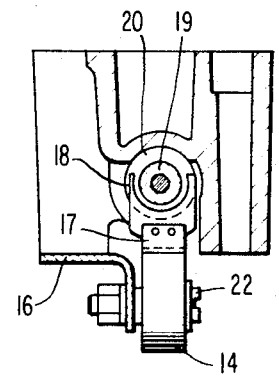
FIG. 2 is a cross-sectional view taken along line II—II of FIG. 1.
Figure 4:
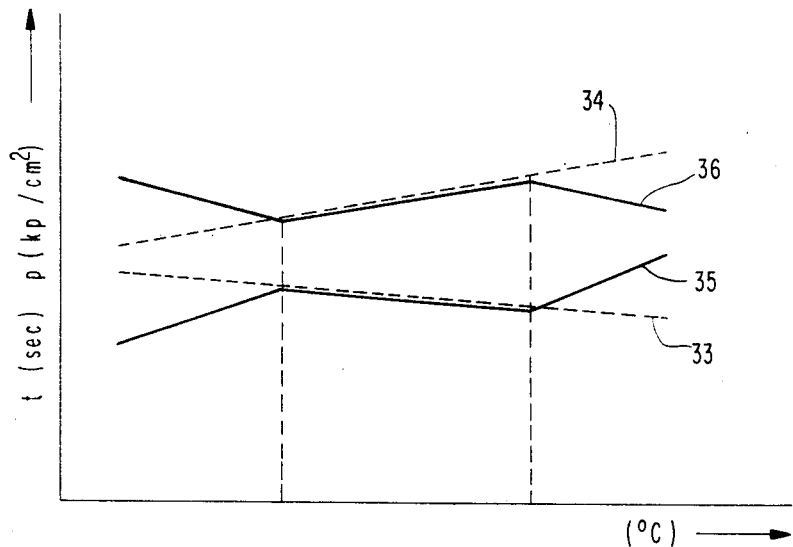
FIG. 4 is a diagram illustrating the function of the regulating installation according to FIGS. 1 and 2.

In FIG. 4, the customary curve of the modulating pressure 33 and therewith of the working or shifting pressure P of an automatic vehicle transmission is plotted in FIG. 4 in dash line as a function of the oil temperature in °C. It can be seen from this figure that the modulating pressure 33 possesses its maximum value in a lower temperature range and decreases constantly toward the upper temperature range with increasing oil temperature. The shifting time 34 also indicated in dash line and plotted against oil temperature proceeds opposite to the curve of the modulating pressure 33; the shifting time 34, starting with a lower temperature range continuously increases with increasing oil temperature. It becomes possible by the regulating installation of the present invention according to FIGS. 1 and 2 to so influence the modulating pressure and therewith the shifting time that they proceed corresponding to the full lines 35 and 36 in FIG. 4. For increasing the shifting comfort by extending the shifting time, the modulating pressure is decreased by the fork 18 of the bimetallic spring 14 abutting at the collar 21. In the middle temperature range, no influencing of the modulating pressure by the spiral spring 14 takes place because in this range the fork 18 does not abut either against the collar 21 or at the other abutment 20 of the regulating slide valve member 3. In the upper temperature range, in which the spiral spring 14 abuts against the abutment 20 of the regulating slide valve member 3, it acts in the opposite direction so that the modulating pressure and therewith the working and shifting pressure is increased whereas the shifting time is reduced.

Figure 5:
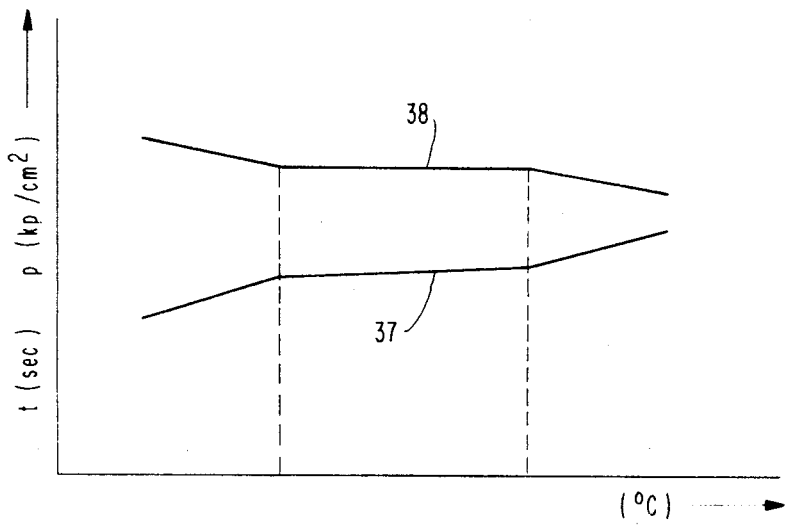
FIG. 5 is a diagram similar to FIG. 4 illustrating the operation of the regulating installation according to FIG. 3.

As illustrated in FIG. 5, the regulating installation according to FIG. 3 effects in the lower and in the upper temperature range the same coordination of shifting time and modulating pressure as is also achieved with the embodiment according to FIG. 1. Since the regulating slide valve member 3 is additionally loaded or acted upon in the middle temperature range by the compression spring 30, an influencing of the modulating pressure 37 and of the shifting time 38 is also obtained in the middle temperature range. Corresponding to the dimensioning and design of the compression spring 30, provision may be made that the modulating pressure 37 is kept constant in this range independently of the oil temperature, or that it increases slightly with respect to the oil temperature. The shifting time 38 then proceeds correspondingly constant in this temperature range.

The modulating pressure and shifting time can be influenced by the selection of the bimetallic spring 14 or 24 and possibly of the compression spring 30. For example, it may be appropriate that the modulating pressure is kept approximately constant over the entire range of the oil temperature as also the shifting time.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. In a regulating installation for controlling the operating pressure and control pressure of a hydraulic medium of an automatic vehicle transmission which installation includes a regulating slide valve means having a piston-like end surface and control edge portions, the regulating slide valve means having the pressure medium supplied thereto for providing in dependence upon the position of the control edge portions at least one of a modulating pressure to an amplifier means and a recycling of the pressure medium, the regulating slide valve means being acted on in one direction by the modulating pressure and in the other direction by diaphragm means operatively connected with the suction pipe vacuum of a vehicle engine, the improvement comprising a bimetallic spring means circumcirculated by the hydraulic medium, said bimetallic spring means having one end fixedly mounted at a part of the regulating installation and having the other end thereof abutting at least within a predetermined temperature range at the regulating slide valve means.

2. A regulating installation according to claim 1, characterized in that a spiral spring means is provided as bimetallic spring means whose inner end is fixedly held whereas the outer end, which is movable in dependence on the temperature, is in the movement path of the regulating slide valve means.

3. A regulating installation according to claim 2, characterized in that the regulating slide valve means includes two abutments for the bimetallic spring means on mutually opposite sides of the free end of the bimetallic spring means and disposed at a distance from one another.

4. A regulating installation according to claim 3, characterized in that the free end of the bimetallic spring means includes a fork-shaped portion which surrounds a neck-shaped extension of the regulating slide valve means provided at one end with a collar.

5. A regulating installation according to claim 4, characterized in that said fork-shaped portion is formed by the free end of the bimetallic spring means.

6. A regulating installation according to claim 4, characterized in that the fork-shaped portion is secured at the free end of the bimetallic spring means.

7. A regulating installation according to claim 4, characterized in that a compression spring means is provided between the free end of the bimetallic spring means and the collar mounted at the end of the neck-shaped extension of the regulating slide valve means.

8. A regulating installation according to claim 7, characterized in that a rotatable and lockable fastening means is provided for the fixed end of the bimetallic spring means.

9. A regulating installation according to claim 8, characterized in that a pivotal lever means adapted to be locked serves as fastening means for the fixed end of the bimetallic spring means.

10. A regulating installation according to claim 9, characterized in that said lever is adapted to be fixed by a threaded means.

11. A regulating installation according to claim 10, characterized in that the bimetallic spring means engages at the regulating slide valve means that abuts at a diaphragm spring of the diaphragm means which is acted upon by a diaphragm of the diaphragm means operatively connected with the suction pipe vacuum of the vehicle engine.

12. A regulating installation according to claim 1, characterized in that the free end of the bimetallic spring means includes a fork-shaped portion which surrounds a neck-shaped extension of a regulating slide valve means provided at one end with a collar.

13. A regulating installation according to claim 12, characterized in that said fork-shaped portion is formed by the free end of the bimetallic spring means.

14. A regulating installation according to claim 12, characterized in that the fork-shaped portion is secured at the free end of the bimetallic spring means.

15. A regulating installation according to claim 12, characterized in that a compression spring means is provided between the free end of the bimetallic spring means and the collar mounted at the end of the neck-shaped extension of the regulating slide valve means.

16. A regulating installation according to claim 12, characterized in that a rotatable and lockable fastening means is provided for the fixed end of the bimetallic spring means.

17. A regulating installation according to claim 16, characterized in that a pivotal lever means adapted to be locked serves as fastening means for the fixed end of the bimetallic spring means.

18. A regulating installation according to claim 17, characterized in that said lever is adapted to be fixed by a threaded means.

19. A regulating installation according to claim 1, characterized in that the bimetallic spring means engages at a regulating slide valve means that abuts at a diaphragm spring of the diaphragm means which is acted upon by a diaphragm of the diaphragm means operatively connected with the suction pipe vacuum of the vehicle engine.

* * * * *